United States Patent [19]

Iwaki et al.

[11] Patent Number: 4,496,898
[45] Date of Patent: Jan. 29, 1985

[54] VEHICLE A.C. GENERATOR WITH CONSTANT OUTPUT POWER

[75] Inventors: Yoshiyuki Iwaki; Mitsuyoshi Yokota; Akio Matsumoto, all of Hyogo, Japan

[73] Assignee: Mitsubishi Denki Kabushiki Kaisha, Tokyo, Japan

[21] Appl. No.: 543,710

[22] Filed: Oct. 20, 1983

[30] Foreign Application Priority Data

Oct. 20, 1982 [JP] Japan .................. 57/159874[U]
Oct. 20, 1982 [JP] Japan .................. 57/159876[U]

[51] Int. Cl.³ .................. H02J 7/14; H02P 9/30
[52] U.S. Cl. .................. 322/34; 322/59; 322/81; 322/DIG. 2
[58] Field of Search .............. 322/33, 34, 81, DIG. 2, 322/27; 310/68 C

[56] References Cited

U.S. PATENT DOCUMENTS

| 2,448,442 | 8/1948 | Kirschbaum | 322/81 X |
| 2,689,936 | 9/1954 | Kirsch et al. | 322/33 X |
| 2,926,297 | 2/1960 | Humber et al. | 322/33 |
| 3,152,298 | 10/1964 | Byles | 322/33 X |
| 3,546,563 | 12/1970 | Thompson | 322/33 X |

Primary Examiner—R. J. Hickey
Attorney, Agent, or Firm—Sughrue, Mion, Zinn, Macpeak and Seas

[57] ABSTRACT

An alternating current (AC) generator of the type used in vehicular applications and driven by the vehicle engine has a stator winding and a field winding wherein the electrical resistance of the field winding varies as a function of temperature. An exciting current intermittently is allowed to flow through the field winding which induces a current in the stator winding. The output of the stator is rectified and used to charge the vehicle battery. The invention comprises inclusion of field winding current compensation apparatus which varies as a function of temperature to reduce undesired field winding current variations due to temperature which results in improvements of power output and stabilized generator driving torque.

2 Claims, 6 Drawing Figures

VEHICLE A.C. GENERATOR WITH CONSTANT OUTPUT POWER

BACKGROUND OF THE INVENTION

The present invention relates to an AC generator mainly for use in an automobile.

In general, an AC generator used in an automobile is of three phase AC type and the output thereof is converted into a DC current by a rectifier in order to charge a battery. Since this type of generator is mounted on an automobile and the conditions for the output of the generator to be saturated in relation to the temperature varies, the resistance value of the field winding is not constant thereby resulting in a variation of the full output power of the generator. Further, the torque required for an engine to drive this type of generator, i.e. a driving torque, is related to the full output power of the generator, so that the driving torque varies when the full output power of the generator varies. Particularly, the rotational speed of the engine in a low speed range disadvantageously varies when the full output power of the generator fluctuates.

FIG. 1 is a circuit diagram of a conventional AC generator for an automobile, in which a reference numeral 1 designates a stator winding capable of generating an AC power, 2 a field winding, 3 a rectifying apparatus having a group of rectifier elements for rectifying the AC power from the stator winding, 4 a voltage control apparatus for controlling the output power of the stator winding by intermittently flowing an exciting current into the field winding 2, and 41 a power transistor of the voltage control apparatus 4. With this construction, when the generator is supplied with a preset voltage such as 13.5 V and delivers the full output power, the power transistor 41 is conducting fully and has a collector-emitter voltage ($V_{CE}(SAT)$) of about 1 V.

Supposing a resistance value of the field winding 2 is R, the preset voltage is V, and the $V_{CE}(SAT)$ of the power transistor 41 is v, a field current $I_f$ can be expressed by $I_f = (V - v)/R$.

The field current $I_f$ is related to the $V_{CE}(SAT)$ of the power transistor and the resistance value R of the field winding. The following explanation will be made on the basis that $I_f$ is substantially in inverse proportion to R, because the fluctuation of $V_{CE}(SAT)$ is a negligible value.

The resistance value R varies when the temperature of the field winding 2 varies to thereby change the magneto-motive force of the field winding. As is well known, the full output power characteristics where the temperature of the field winding is the same as the atmospheric temperature is referred to as the output power characteristics in a cooled state. The full output power characteristics where the temperature of the field winding is increased to a saturated state due to the Joule heat of the conduction current thereof is referred to as the output power characteristics in a heated state. The output characteristics in the cooled and heated states are illustrated in FIG. 2 by dotted and solid lines, respectively. The difference between the output current characteristics in the cooled and heated states is mainly due to the change in the resistance value of the field winding. The difference of the output current in the cooled and heated states results in the different driving torques, as shown in FIG. 2, which accounts for the variation in the rotational speed of the engine.

An object of the present invention is to provide an AC generator for a vehicle which obviates the above described drawbacks of the conventional AC generator.

DETAILED DESCRIPTION OF THE INVENTION

Figure 1:
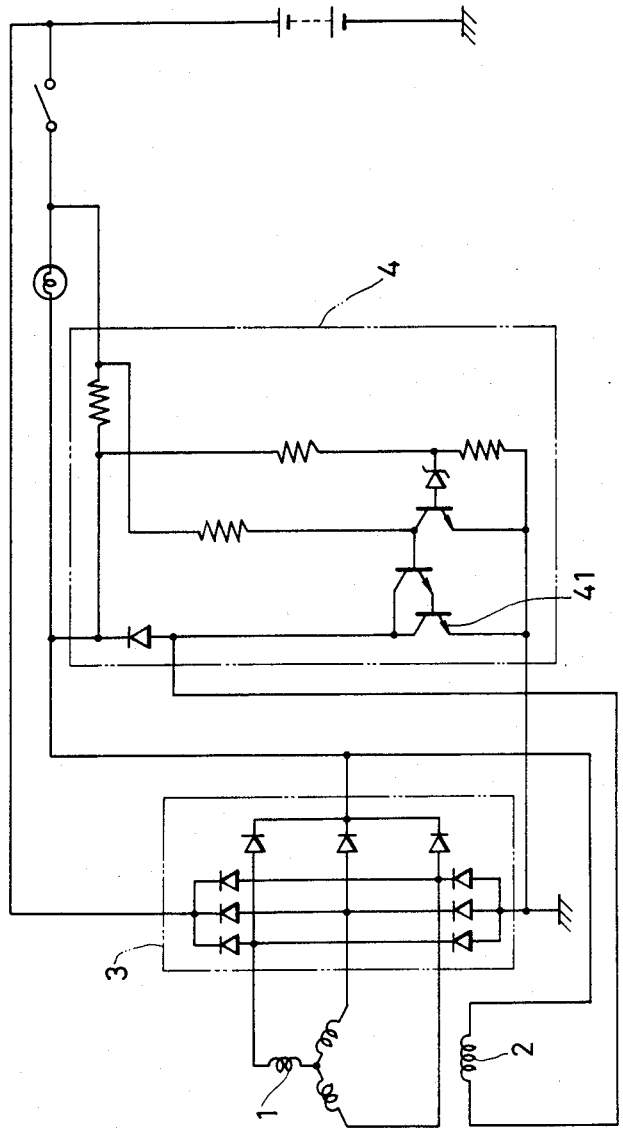
FIG. 1 is a circuit diagram of a conventional AC generator for a vehicle.
Figure 2:
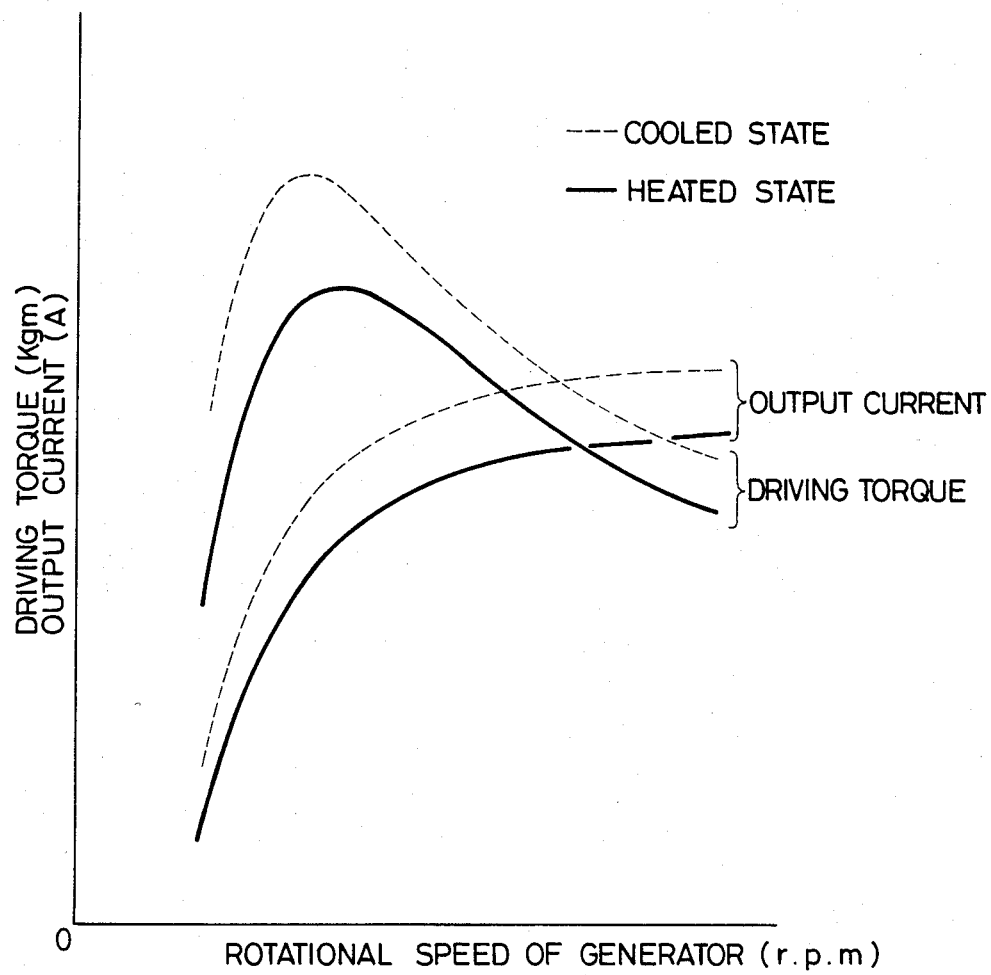
FIG. 2 is a graph illustrating output characteristics of the conventional AC generator.
Figure 3:
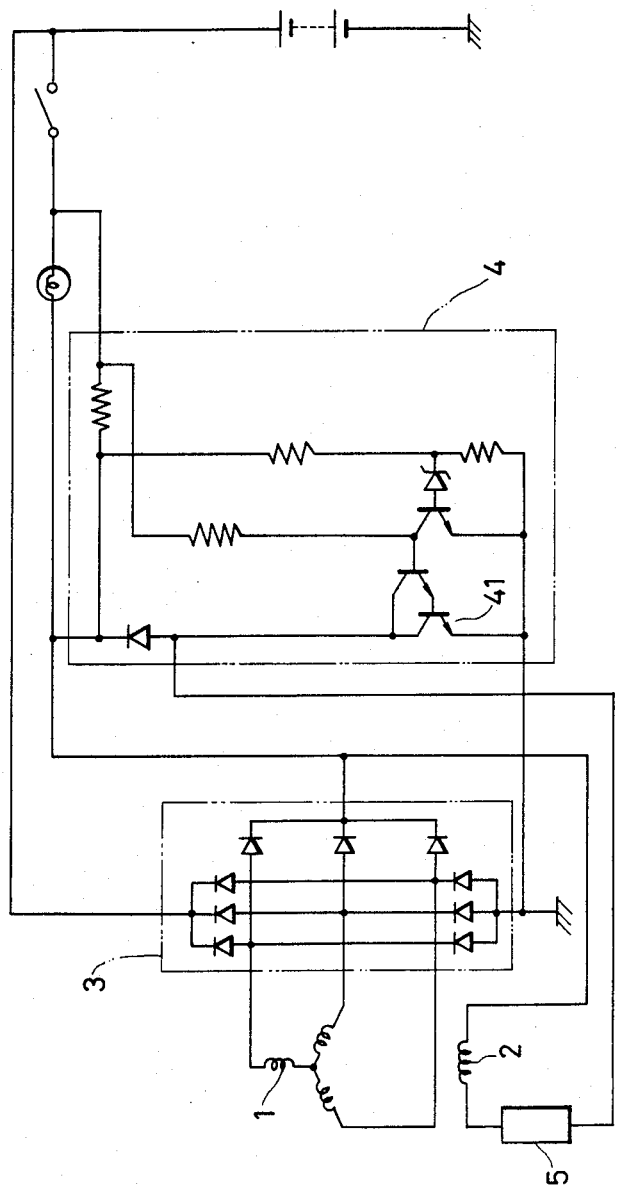
FIG. 3 is a circuit diagram of a first embodiment of the AC generator according to the present invention.

A first embodiment of the present invention will be explained referring to FIGS. 3 to 5. In FIG. 3 the elements shown by the same reference numerals as in FIG. 1 have the same functions as the elements in FIG. 1. In FIG. 3, a reference numeral 5 designates a temperature compensation apparatus composed of parts having negative temperature coefficients such as thermistors. In this configuration, the current flowing into a field winding 2 is made constant by making the resistance value of the temperature compensation apparatus 5 compensate for the resistance value of the field winding. Therefore, the resistance of temperature compensation apparatus 5 is relatively high when the resistance value of a field winding 2 is relatively low, and the resistance value of the apparatus 5 is made lower when an increased field current flows into the field winding 2 and the resistance value of the field winding becomes higher. Thus, the difference in the output current of the AC generator between the cooled and heated states is substantially nullified by the provision of the temperature compensation apparatus with the negative temperature coefficient arranged so as to cancel the positive temperature coefficient of the field winding 2.

Figure 4:
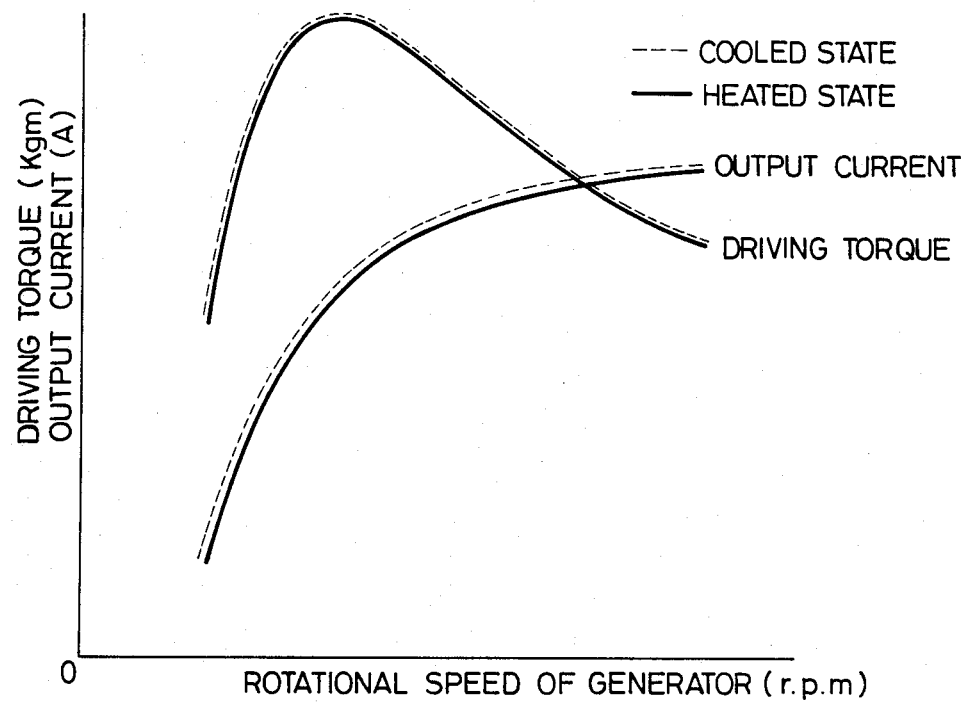
FIG. 4 is a graph illustrating output characteristics of the AC generator according to the first and second embodiments of the invention.
Figure 5:
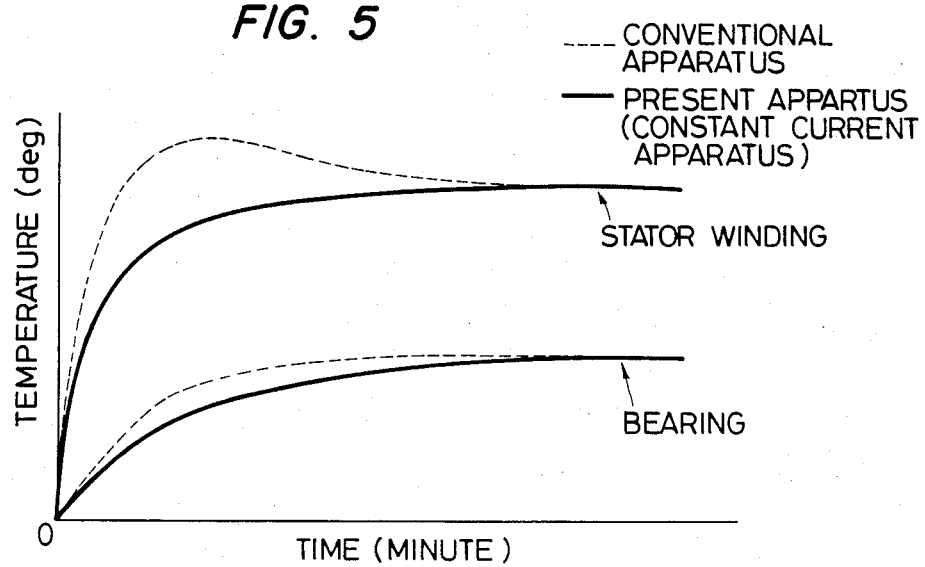
FIG. 5 is a graph illustrating the change in temperature which several components of the conventional AC generator and the AC generator according to the first and second embodiments of the present invention experience over time.

By the circuit arrangement shown in FIG. 3, the driving torque becomes the same value in both the cooled and heated states, as shown in FIG. 4, to thereby prevent fluctuation of the speed of the engine. FIG. 5 is a graph illustrating the change in temperature which several components of the conventional AC generators and the AC generator according to the present invention experience over time. It will be apparant from FIG. 5 that the time constant of the temperature increase of the AC generator according to the present invention is larger than that of the conventional apparatus, which means that the calorific power generated per unit time by the AC generator according to the present invention is smaller than that of the conventional AC generator. Thus, in the AC generator according to the present invention, the increase of the atmospheric temperature around the engine is small, thereby improving the durability of wires and other equipment disposed around the engine.

As described above, the AC generator according to the first embodiment of the present invention, the full output power of the AC generator is kept constant, even if the atmospheric temperature around the field winding changes, to thereby prevent fluctuation of the rotational speed of the engine. This result is achieved by providing the temperature control apparatus with a negative temperature coefficient between the field winding and the voltage control apparatus.

Figure 6:
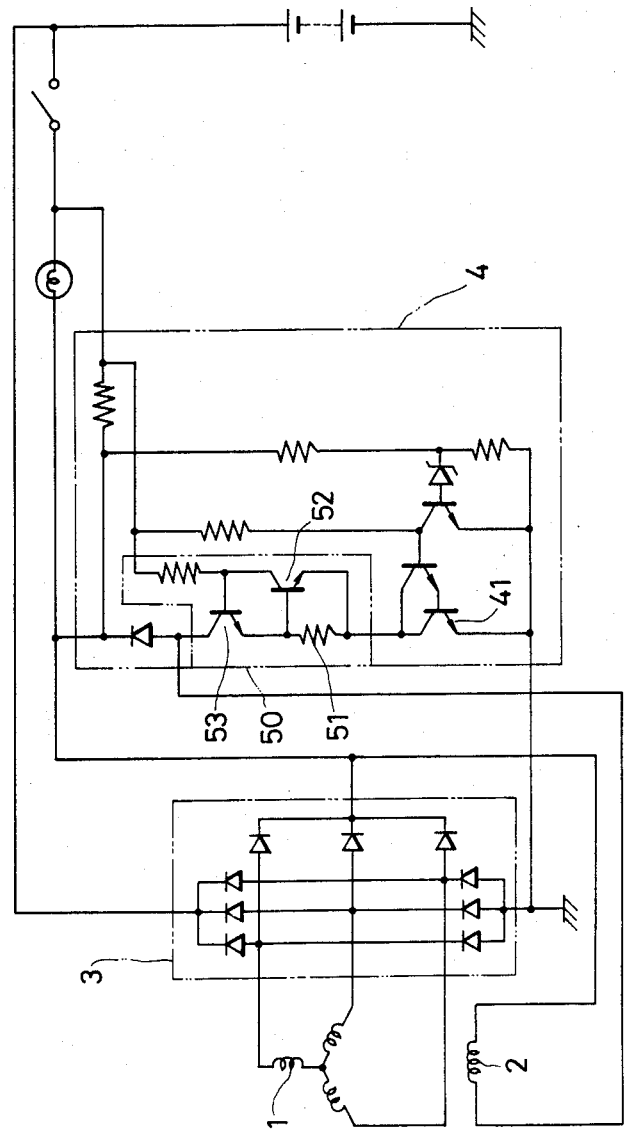
FIG. 6 is a circuit diagram of a second embodiment of the AC generator according to the present invention.

A second embodiment of the present invention will be explained referring to FIGS. 4 to 6. In FIG. 6 the elements shown by the same reference numerals as FIG. 1 have the same functions as the elements in FIG. 1. In FIG. 6, a reference numeral 50 designates a constant current apparatus. In this configuration, if a field current flows into a field winding 2, a voltage drop appears across a resistor 51 to turn on a transistor 52 which acts to keep constant the current flowing through the collector-emitter circuit of a transistor 53, so that the current flowing into the field winding 2 is made constant. Therefore, even if the resistance value of the field winding 2 becomes larger due to Joule heat generated therefrom, the difference in the output current of the AC generator between the cooled and heated states is substantially nullified. Thus, the circuit arrangement shown in FIG. 6 has been designed to maintain the field winding current constant during temperature variations of the AC generator.

Therefore, in the second embodiment similarly to the first embodiment, the driving torque becomes the same value in both the cooled and heated states as shown in FIG. 4, to thereby prevent the fluctuation of the speed of the engine. FIG. 5, as mentioned with regard to the first embodiment, is a graph illustrating the change of the temperature of several components of the conventional AC generators and the AC generator according to the present invention and is also applicable to the second embodiment. It should be apparant from FIG. 5 that the time constant of the temperature increase of the AC generator according to the present invention is larger than that of the conventional apparatus, which means the calorific power generated per unit time by the AC generator according to the second embodiment of the present invention, similarly to the first embodiment, is smaller than that of the conventional AC generator. Thus, in the AC generator according to the present invention, the increase of the atmospheric temperature around the engine is small thereby improving the durability of wires and other equipment disposed around the engine.

As described above, in the AC generator according to the second embodiment of the present invention the output characteristics thereof are made substantially the same in the cooled and heated states, thereby preventing fluctuation of the rotational speed of the engine by providing the constant current apparatus between the field winding and the voltage control apparatus.

We claim:

1. An AC generator for a vehicle, comprising; a field winding having a temperature dependent resistance, a stator winding, said stator and field winding being provided for generating AC power, a rectifying apparatus for rectifying said AC power, a voltage control apparatus for interrupting an exciting current flowing into said field winding, and a constant current source further comprising a switching device connected in series with said field winding, a control device which outputs a control signal having a signal level proportional to the magnitude of said field winding current, and a second switching means which is activated in response to said control signal and in accordance with the signal level of said control signal for controlling the conductivity of said first switching means.

2. An AC generator for a vehicle, as claimed in claim 1, wherein said constant current source comprises: a first transistor having its collector connected to said field winding, a resistor having one end connected to an emitter of said first transistor and having its other end connected to said voltage control apparatus, and a second transistor having its base connected to said one end of said resistor, wherein said field winding current flows through the collector-emitter path of said first transistor and said resistor, causing a voltage drop across said resistor, the amount of said voltage drop determining the conductance of said second transistor, and the conductance of said second transistor acting to maintain said field winding current flowing through the collector emitter path of said first transistor and said resistor constant.

* * * * *